(12) United States Patent
Kemper et al.

(10) Patent No.: US 7,116,004 B2
(45) Date of Patent: Oct. 3, 2006

(54) METHOD FOR REGULATING THE OPERATION OF A DEVICE FOR GENERATING ELECTRIC ENERGY BY MEANS OF A GENERATOR DRIVEN BY A FREE-PISTON INTERNAL COMBUSTION ENGINE

(75) Inventors: Hans Kemper, Aachen (DE); Christian Boie, Aachen (DE); Hendrikus Janssen, Aachen (DE)

(73) Assignee: Fev Motorentechnik GmbH, Aachen (DE)

( * ) Notice: Subject to any disclaimer, the term of this patent is extended or adjusted under 35 U.S.C. 154(b) by 0 days.

(21) Appl. No.: 11/190,910

(22) Filed: Jul. 28, 2005

(65) Prior Publication Data
US 2005/0257757 A1    Nov. 24, 2005

Related U.S. Application Data

(63) Continuation of application No. 11/069,933, filed on Mar. 2, 2005, which is a continuation of application No. PCT/EP03/07330, filed on Jul. 8, 2003.

(30) Foreign Application Priority Data
Sep. 3, 2002    (DE)    ................................ 102 41 101

(51) Int. Cl.
*F02D 29/06*    (2006.01)
*H02P 9/04*    (2006.01)
(52) U.S. Cl. ...................................... 290/40 C; 60/595
(58) Field of Classification Search ............... 290/40 C
See application file for complete search history.

(56) References Cited

U.S. PATENT DOCUMENTS 2,916,025 A * 12/1959 Klotsch .................... 123/46 R
3,443,111 A    5/1969 Monpetit et al. ........... 290/1 R (Continued)

FOREIGN PATENT DOCUMENTS

DE    19625182    1/1998

*Primary Examiner*—Darren Schuberg
*Assistant Examiner*—Pedro J. Cuevas
(74) *Attorney, Agent, or Firm*—Venable LLP; Robert Kinberg; Steven J. Schwarz

(57) ABSTRACT

The present invention relates to a method for controlling an electrical generator comprising a two-stroke free piston internal combustion engine having a first cylinder and a second cylinder aligned on a common axis, a first piston pair comprising a first piston and a second piston located in the first cylinder, a second piston pair comprising a first piston located in the second cylinder and connected to the second piston in the first cylinder by a first connecting rod and a second piston located in the second cylinder and connected to the first piston in the first cylinder by a second connecting rod, with the first and second pistons of each piston pair moving in opposite directions to one another, a fuel supply for providing fuel to at least one of the first cylinder or the second cylinder, and a generator comprising at least one rotor connected to at least one of the first connecting rod or the second connecting rod, and at least one stator winding that cooperates with the at least one rotor to generate electricity. The method comprises detecting at least one of piston speed or piston position for at least one of the first piston pair or the second piston pair, and adjusting a compression ratio in at least one of the first cylinder or the second cylinder by at least one of impinging a voltage on the stator winding or altering the fuel supply.

8 Claims, 3 Drawing Sheets

U.S. PATENT DOCUMENTS

| | | | | |
|---|---|---|---|---|
| 3,541,362 A | | 11/1970 | Pouit | 310/15 |
| 5,540,193 A | * | 7/1996 | Achten et al. | 123/46 SC |
| 5,913,290 A | | 6/1999 | Kvamsdal et al. | 123/46 R |
| 5,923,104 A | * | 7/1999 | Haaland et al. | 310/11 |
| 6,035,637 A | * | 3/2000 | Beale et al. | 60/595 |
| 6,427,643 B1 | * | 8/2002 | Dixon | 123/48 A |
| 6,918,371 B1 | * | 7/2005 | Shimazaki | 123/305 |
| 6,947,830 B1 | * | 9/2005 | Froloff et al. | 701/111 |
| 2002/0059907 A1 | * | 5/2002 | Thomas | 123/43 AA |
| 2004/0163619 A1 | * | 8/2004 | Thomas | 123/241 |
| 2004/0211372 A1 | * | 10/2004 | Shimazaki | 123/25 C |

\* cited by examiner

METHOD FOR REGULATING THE OPERATION OF A DEVICE FOR GENERATING ELECTRIC ENERGY BY MEANS OF A GENERATOR DRIVEN BY A FREE-PISTON INTERNAL COMBUSTION ENGINE

CROSS-REFERENCE TO RELATED APPLICATIONS

This application is a continuation of U.S. application Ser. No. 11/069,933, filed on Mar. 2, 2005, which is a continuation of International Patent Application No. PCT/EP2003/007330, filed on Jul. 8, 2003, based on German priority application 102 41 101.8, filed on Sep. 3, 2002, priority of which is claimed by the present application. The disclosure of each of the foregoing applications is incorporated herein by reference.

BACKGROUND OF THE INVENTION

A two-stroke free piston internal combustion engine used as drive means is known. Such an engine includes two coaxial cylinders which are positioned one behind the other, with each cylinder containing a pair of pistons that operate in opposition to one another. The individual pistons of each piston pair, that move in the same direction, are interconnected with one another. Each piston pair delimits a combustion chamber in its respective cylinder, so that with alternate firing of the cylinders, the pistons of each piston pair move back and forth in opposite directions. In this process, the movement energy is tapped at the interconnection of the pistons, and can be used, for example, for driving an electric generator.

It is an object of the present invention to provide a method for controlling the operation of this type of a device when used for generating electric energy, in a way that effects stable operation of the free piston internal combustion engine.

SUMMARY OF THE INVENTION

The present invention is directed to a method for controlling an electrical generator comprising a two-stroke free piston internal combustion engine having a first cylinder and a second cylinder aligned on a common axis, a first piston pair comprising a first piston and a second piston located in the first cylinder, a second piston pair comprising a first piston located in the second cylinder and connected to the second piston in the first cylinder by a first connecting rod and a second piston located in the second cylinder and connected to the first piston in the first cylinder by a second connecting rod, with the first and second pistons of each piston pair moving in opposite directions to one another, a fuel supply for providing fuel to at least one of the first cylinder or the second cylinder, and a generator comprising at least one rotor connected to at least one of the first connecting rod or the second connecting rod, and at least one stator winding that cooperates with the at least one rotor to generate electricity, the method comprising: detecting at least one of piston speed or piston position for at least one of the first piston pair or the second piston pair; and adjusting a compression ratio in at least one of the first cylinder or the second cylinder by at least one of impinging a voltage on the stator winding or altering the fuel supply.

Optimal operation of the free piston internal combustion engine can be obtained by setting a pre-defined compression ratio. Interferences in the free movement of interconnected pistons of the piston pairs directly affect the actual compression ratio, as well as the operating frequency of the internal combustion engine. The piston position inside the cylinder, the piston movement, and the piston movement sequence can be detected using a sensor arrangement. The corresponding measuring signals can be determined from this with respect to the actual compression ratio and also the operating frequency.

By linking the piston connection to the rotor of a generator and exerting control via power end stages that are connected to the stator winding, the stator winding of the generator can be impinged with a timed, controlled voltage and the operation of the free piston internal combustion engine can thus be stabilized, corresponding to variances from the preset control value for the compression ratio and, if necessary, by modification of the fuel metering.

A particular advantage of the control method according to the invention is that the detection of the compression ratio and the piston movement sequence tied thereto occurs during a single operating cycle, so that a control intervention that may become necessary can be activated during the following operating cycle via the impinging voltage to the stator winding and/or via the fuel metering, thereby permitting an extremely fast and sensitive control of the operating behavior of the free piston internal combustion engine. A precise control mechanism is thus available to ensure the stable operation of a free piston internal combustion engine for such a device for generating electrical energy.

If a buffer storage unit in the form of a storage battery or a capacitor is provided between the consumer and the generator, as shown for one exemplary embodiment of the invention, or if a different external voltage source connected to the power end stages is provided, it is possible to maintain uniform operation, for example, when one of the cylinders misfires. In case of a misfiring in one cylinder, the generator can be operated by the control as a motor for the operating stroke, by correspondingly impinging the stator winding. Thus, the specified compression ratio for the immediately following operating cycle of the other cylinder is at least approximately reached, and the operating cycle can take place while, at the same time, the necessary compression can again be reached in the misfiring cylinder, such that the following operating cycle can take place.

Also, a series of misfirings in the same cylinder can be detected and the machine operation can be stopped with a corresponding design for the control device.

For the two-stroke free piston internal combustion engine, particularly well-suited for use in this case, the fuel can be supplied through direct injection into the combustion chambers or through injection into the air intake channels. The supplied fuel can be ignited through external ignition or auto-ignition.

While it is possible in principle to convert a back and forth movement of the two piston pairs to a rotating movement by using a corresponding gear arrangement and thus operate a traditional electric generator, the use of a so-called linear generator is advantageous. A linear generator is provided with a stator, having a winding with at least one coil, as well as a rod-shaped rotor which moves back and forth. Different operating principles are known for this, for example, the use of a permanent-magnetic effect, the effect of reluctance, or an inductive effect with a varying number of phases. In that case, only one connection between the pistons of the two piston pairs can be embodied as a rotor while the movement energy from the connection between the two other pistons of the piston pairs is coupled mechanically into the rotor, for example, via a corresponding gear, so that only one generator is needed.

The position of the respective piston pairs in the associated cylinders can be influenced by means of a controlled, timed voltage that impinges on the generator winding. As a result, the compression ratio in the cylinders of the internal combustion engine can be influenced independently of the load accepted by the generator. For an embodiment that requires a load change via slots, the center position of the combustion chamber, respectively delimited by the two pistons, can advantageously be displaced relative to the slots, such that a change in the "valve overlap" is possible.

Additional features of the invention are disclosed in the following description of the exemplary embodiments.

BRIEF DESCRIPTION OF THE DRAWINGS

These and other features and advantages of the invention will be further understood from the following detailed description of exemplary embodiments considered in conjunction with the accompanying drawings, which show in.

DETAILED DESCRIPTION OF PREFERRED EMBODIMENTS

Figure 1:
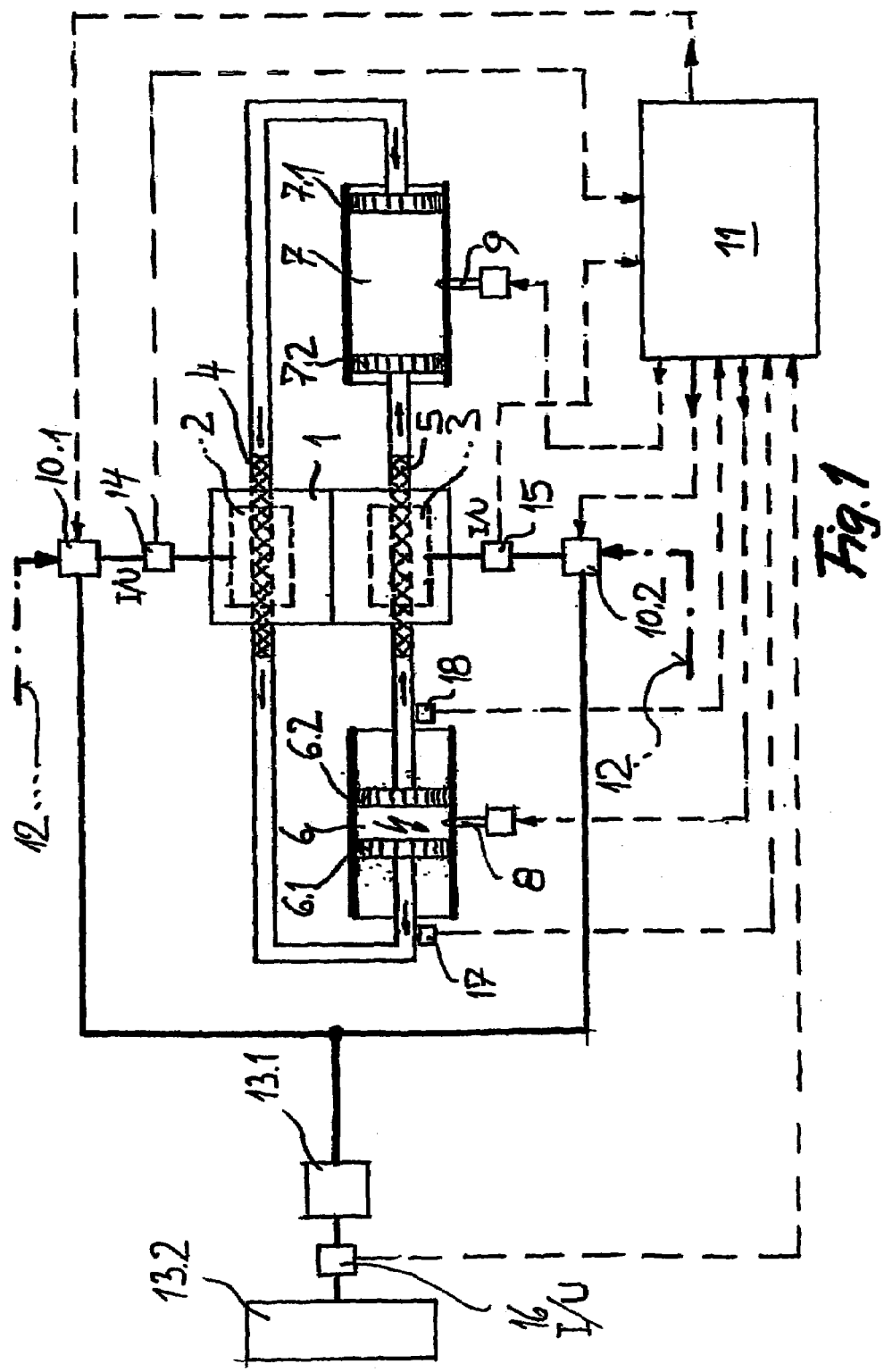
FIG. 1 A schematic layout of a device for generating electric energy by means of a linear generator drive and a free piston internal combustion engine.

FIG. 1 shows an exemplary generator assembly for generating electric energy. The generator assembly comprises two parallel-connected linear generators 1, each including a stator winding 2, 3. The stator windings 2, 3 can each comprise one of several possible coils. Rotors 4 and 5 are assigned to the stator windings 2, 3, respectively, and can move back and forth relative to the stator windings 2, 3 for generating electric energy.

According to one exemplary embodiment of the present invention, a two-stroke, two-cylinder free piston internal combustion engine is used to operate the generator assembly. The engine comprises two cylinders 6 and 7, arranged coaxially one behind the other. Pistons 6.1 and 6.2 are located in cylinder 6 and are guided back and forth is opposition to one another. Likewise, pistons 7.1 and 7.2 are located in cylinder 7 and are guided back and forth in opposition to one another.

Pistons 6.1 and 7.1 are connected to rotor 4, such that back and forth movement of these pistons is transferred directly to rotor 4. Similarly, pistons 6.2 and 7.2 are connected to rotor 5, so that the back and forth movement of these pistons is transferred directly to rotor 5.

The structural elements for the charge change are not shown herein. The charge change, preferably via longitudinal-current, occurs either by means of controlled valves or via corresponding elongated slots in the cylinder wall, as is known from two-stroke engines. An arrangement that comprises a scavenging pump, not shown in further detail herein, or an additional loader, has been found to work well.

Each piston pair 6.1, 6.2 and 7.1, 7.2 delimits a combustion chamber. For the exemplary embodiment shown, fuel is supplied to the combustion chamber through direct injection with the aid of injection nozzles 8 and 9. However, the fuel can also be supplied by injecting it into the air-intake channels which are not shown in further detail herein. Depending on the design of the motor, the fuel can be ignited either through external ignition or auto-ignition. Cylinders 6 and 7 are fired alternately.

FIG. 1 shows the arrangement during operation, that is to say following the ignition of the fuel-air-mixture at the start of the expansion stroke in cylinder 6. In the process, the two pistons 6.1 and 6.2 are pushed apart as a result of the gas pressure, while the two pistons 7.1 and 7.2 move toward each other and thus compress the contents of cylinder 7. As a result, cylinder 7 will be fired during the following cycle, and then the operating sequence will reverse.

As a result of the above process, the two rotors 4 and 5 move in opposite directions through their associated stator windings 2 and 3, and generate corresponding "blocks" of electric energy due to the back and forth movement.

The back and forth movement of the rotors 4, 5 permits detection of the speed and position of the pistons inside the cylinders 6, 7. This makes it possible to tap an amount of electrical energy from the generator 1 that corresponds to the amount of mechanical energy generated by the pistons, by using corresponding control and timed feeding of voltage to the stator windings 2, 3.

For this purpose, the two stator windings 2, 3 are provided with controllable power end stages 10.1 and 10.2 that can be triggered via a controller 11. The power end stages 10.1, 10.2 can be connected to one or more separate power sources 12, as indicated herein.

A consumer is connected downstream of the power end stages 10.1 and 10.2. A buffer unit 13.1 in the form of, for example, a storage battery or a storage capacitor can be connected downstream of the consumer, so that the discontinuously generated energy for the consumer can be tapped by the consumer in the form of a continuous, or uniform energy supply.

Sensors 14 and 15 are assigned to the stator windings 2 and 3, and function to detect the generated voltage and the generated current, and communicate the detected value to the controller 11. The power end stages 10.1 and 10.2 are triggered by way of the controller 11, such that by effecting a corresponding change in the timed voltage impinging on the stator windings 2 and 3, the speed curve for the rotors 4, 5 and thus the compression ratio can be influenced and can preferably be kept constant during each operating cycle. This can be achieved, for example, by purposely slowing down or accelerating the rotors 4, 5 via the timed voltage impinging on the stator windings 2, 3, and/or by changing the fuel metering, for example, by changing the injection duration. A relatively fast internal control loop is thus available for the control method.

The electric energy tapped by the consumer 13 can be detected by means of a sensor 16, for example, by measuring the current and/or the voltage. This measuring value can also be supplied to the controller 11, which can use this information to control the fuel metering in response to the amount of tapped electric energy.

In place of or in addition to the previously described electric sensor arrangement (which comprises, for example, sensors 14 and 15), two sensors 17 and 18 can be assigned to at least one of the two cylinders 6, 7. Sensors 17 and 18 can be used to detect the respective positions of the pistons in the cylinders, especially the respective upper dead center positions, in order to control the fuel supply and/or to trigger the ignition (in the case where an internal ignition is used).

Sensors 17, 18 can also be used in conjunction with an exemplary embodiment of controller 11 to detect the piston movement sequence. The compression ratio can be derived from the value detected for the respective end position reached by each of the pistons. By detecting the position change of the pistons over time, the course of the movement speed of the pistons can be detected, thus providing controller 11 with the necessary measuring values for a relatively fast control.

To provide constant, or optimum operation of the free piston internal combustion engine, the compression ratio can be input into the internal control loop of the controller 11 as a pre-definable value. The compression ratio in this case can be stored in the form of a load-dependent performance characteristic, so that a different pre-defined value for the variance comparison can respectively be specified for different load cases.

Figure 2:
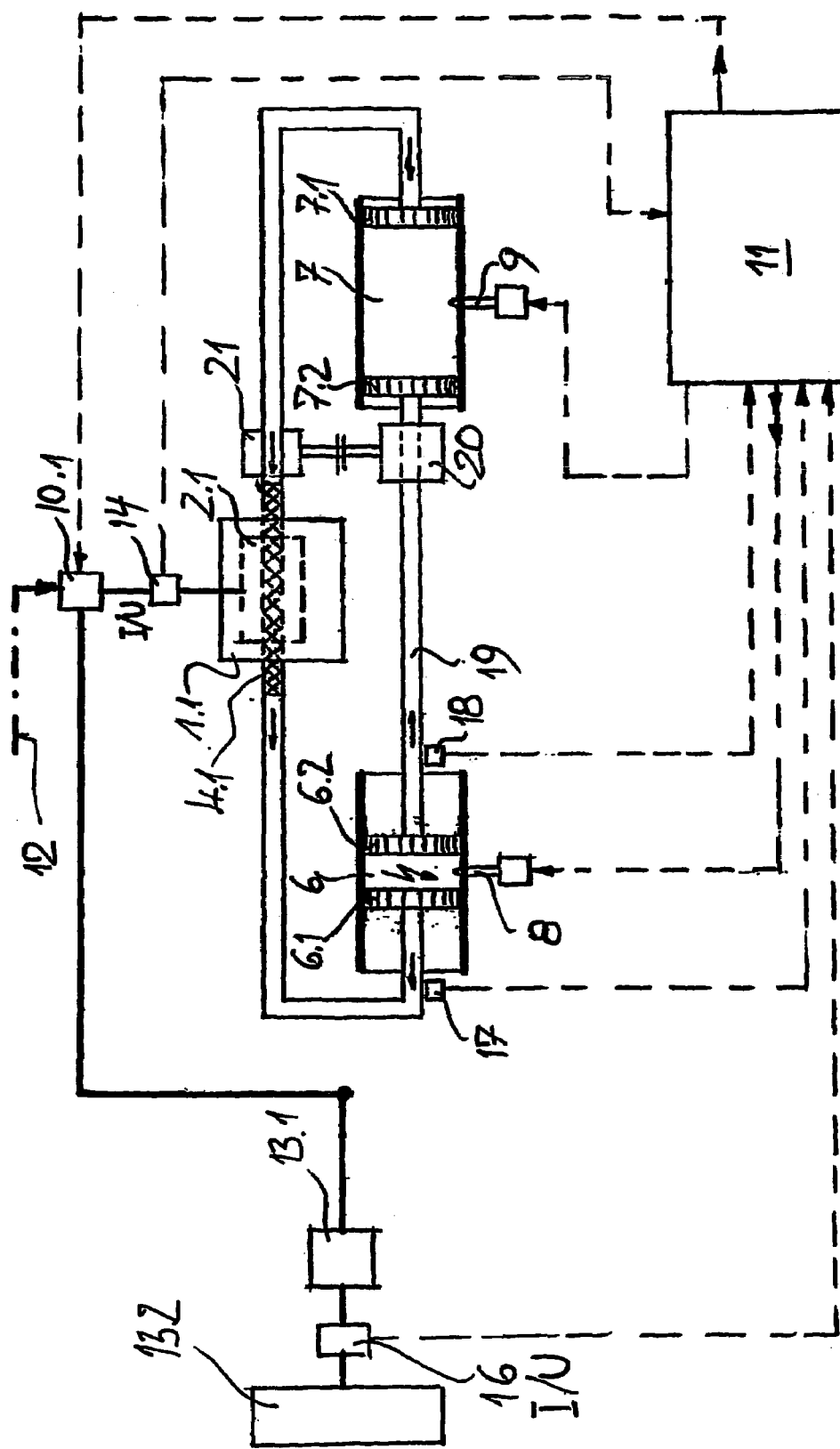
FIG. 2 A modified version of the layout according to FIG. 1.

The device shown in FIG. 2 is a modified version of the device shown in FIG. 1, and uses a single linear generator 1.1 in place of two linear generators. The single generator 1.1 comprises a stator winding 2.1 with one or more coils. The associated rotor 4.1 is attached to a connecting rod or other member rigidly coupling pistons 6.1 and 7.1. Pistons 6.2 and 7.2 are similarly rigidly coupled together, for example, by connecting rod 19. Connecting rod 19 is connected to a reversing gear 20, which includes an output drive 21 that acts upon the rigid connection between pistons 6.1 and 7.1, and thus transfers the movement energy of the pistons 6.2 and 7.2 to the rotor 2.1.

Figure 3:
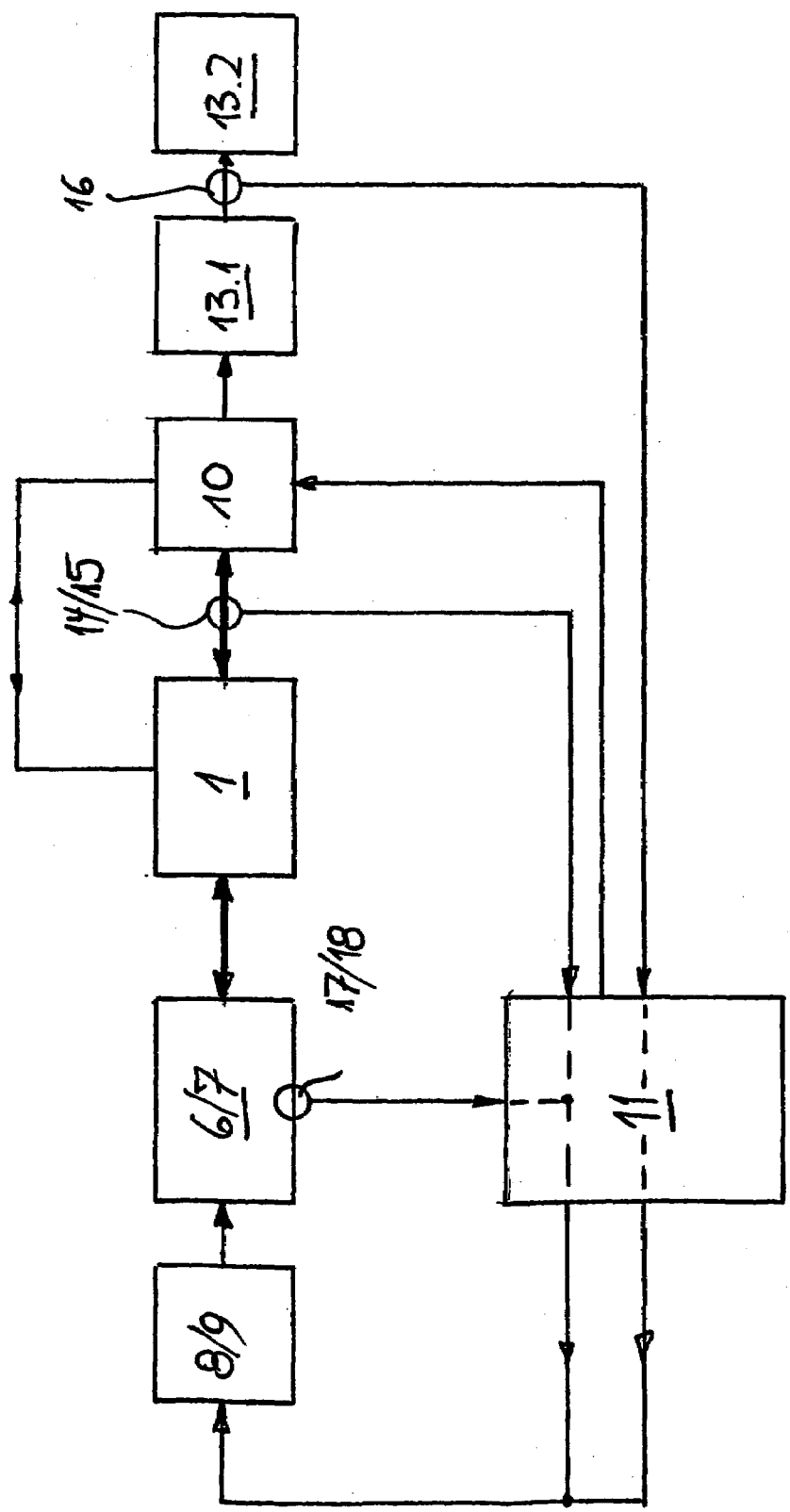
FIG. 3 A block wiring diagram of the control.

Referring to FIG. 3, an exemplary control loop 3 is shown in the form of a block wiring diagram with interconnections. The reference numbers used in FIG. 1 to identify the individual components are also used in FIG. 3.

The block wiring diagram shows that the linear generator 1, the free piston internal combustion engine 6, 7, and the power end stages 10.1, 10.2 (represented in FIG. 3 by reference number 10) all interact. In the event that an unstable operating situation develops for the free piston internal combustion engine, the stator winding and, if necessary, also the fuel-injection nozzles 8, 9 are triggered by means of the fast internal control loop, formed by the controller 11 via the sensors 14, 15 and the power end stages 10.

The inner control loop is assigned an outer control loop which permits the controller 11 to detect via the sensor 16 the respectively tapped (electric) load and to adapt the fuel metering accordingly.

Since linear generator 1 can also operate as a motor if supplied with electric energy, the device shown herein for generating electric energy can also be used to start up the free piston internal combustion engine 6, 7. A storage unit 13.1 in the form of a storage battery or a capacitor may be connected upstream of the consumer, and can be used for this purpose. If the capacity of the storage unit 13.1 is not sufficient, a corresponding external current source 12 may be used, as previously indicated in FIG. 1. This start-up operation can be initiated via the controller 11 and a corresponding triggering of the power end stages 10.

The mode of operation for the control is summarized below. The continuous detection of the mechanical state variables (for example, piston speed, piston positions) provides the trajectory for the pistons in the state space.

By estimating the amount of chemical energy that is actually converted during the operating cycle from the trajectory following the piston reversal point in the dead center position, it is possible to make a prediction of the amount of energy that must be converted by the generator for stable operation of the internal combustion engine and to achieve a specified target state (for example, compression ratio, operating frequency of the internal combustion engine) just prior to the next combustion start. As a result of timed impinging of voltage during the operating stroke, the generator can be operated briefly in the manner of a motor in order to compensate for external interfering influences in the piston movement sequence. In particular, it is possible to detect and override misfirings.

The generator can determine the switching moments and switching voltages for realizing the amount of energy converted by the generator from the internal combustion engine, while, at the same time, the trajectory is monitored continuously and the switching moments and switching voltages are corrected accordingly.

The voltages in the coils of the stator winding are switched via semi-conductor bridges and based on the control algorithm result during a single stroke of the internal combustion engine to +Ub and/or 0 and 7 or −Ub. In the process, a change in the impinging voltage load between +Ub and/or −Ub, or no voltage change at all, can occur for fractions of the stroke duration (Ub is the operating voltage in this case) of one operating stroke, corresponding to the pre-defined control values obtained by means of the sensor arrangement. As a result and during one stroke for stabilizing the operation of the internal combustion engine, the pistons of the momentarily fired cylinder are slowed down and/or driven by means of the generator, depending on the impinging voltage, or they can follow the effect of the gas forces for the load removal by the generator. The pre-defined voltage impingement can change during one stroke, so that the piston movement follows the trajectory detected by the controller and the specified values for compression and operating frequency.

Since the magnetic forces exerted by the generator onto the internal combustion engine are clearly lower in the region of the reversing points than the gas forces, the energy conversion occurs primarily in the center portion of the trajectory (higher piston speed), meaning respectively before the firing point. As a result, the free piston internal combustion engine must be started by means of resonance excitation and with the aid of the generator functioning as a motor. This can be achieved via the controller 11 with the same algorithm and using the sensor signals. In particular, it is possible to suppress the injection until an ignitable compression ratio is reached.

To start the internal combustion engine from a standstill, it is necessary to calibrate the sensors and adjust a center position for the pistons which is done by using the generator and displacing the pistons toward mechanical end stops. The compression effect in this case can be switched off with the aid of slots.

To shut down the system, the coils of the stator winding can purposely be supplied with current in such a way that following the shut-down of the injection, the pistons are stopped symmetrically. In particular, the pistons can be stopped immediately following the last combustion or they can perform additional generator-operated flushing cycles.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for controlling an electrical generator comprising a two-stroke free piston internal combustion engine having a first cylinder and a second cylinder aligned on a common axis, a first piston pair comprising a first piston and a second piston located in the first cylinder, a second piston pair comprising a first piston located in the second cylinder and connected to the second piston in the first cylinder by a first connecting rod and a second piston located in the second cylinder and connected to the first piston in the first cylinder by a second connecting rod, with the first and second pistons of each piston pair moving in opposite directions to one another, a fuel supply for providing fuel to at least one of the first cylinder or the second cylinder, and a generator comprising at least one rotor connected to at least one of the first connecting rod or the second connecting rod, and at least one stator winding that cooperates with the at least one rotor to generate electricity, the method comprising:

detecting at least one of piston speed or piston position for at least one of the first piston pair or the second piston pair; and adjusting a compression ratio in at least one of the first cylinder or the second cylinder by at least one of impinging a voltage on the stator winding or altering the fuel supply.

2. The method of claim 1, further comprising detecting at least one of voltage or current generated by the generator, and adjusting the compression ratio based on at least one of the detected voltage or current.

3. The method of claim 1, further comprising controlling movement of at least one of the first piston pair or the second piston pair by impinging a voltage on the generator and altering the fuel supply.

4. The method of claim 1, further comprising controlling at least one a relative position between at least one of the first or second piston pairs or the compression ratio in at least one of the first cylinder or the second cylinder by altering the fuel supply.

5. The method of claim 1, wherein the generator is a linear generator.

6. The method of claim 1, further comprising providing an external current supply to the generator for starting the internal combustion engine.

7. The method of claim 1, wherein the step of detecting at least one of piston speed or piston position for at least one of the first piston pair or the second piston pair includes using a sensor arrangement.

8. The method of claim 1, wherein the step of adjusting a compression ratio in at least one of the first cylinder or the second cylinder includes using a sensor arrangement.

\* \* \* \* \*